(12) United States Patent
Yoon et al.

(10) Patent No.: US 9,386,622 B2
(45) Date of Patent: Jul. 5, 2016

(54) CALL SERVICE METHOD AND APPARATUS

(71) Applicant: Samsung Electronics Co., Ltd., Gyeonggi-do (KR)

(72) Inventors: Suha Yoon, Seoul (KR); Kwangweon Park, Gyeonggi-do (KR); Seokjun Baek, Gyeonggi-do (KR); Sunghyuk Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/689,783

(22) Filed: Apr. 17, 2015

(65) Prior Publication Data
US 2015/0304603 A1 Oct. 22, 2015

(30) Foreign Application Priority Data

Apr. 17, 2014 (KR) ........................ 10-2014-0046002

(51) Int. Cl.
*H04N 7/15* (2006.01)
*H04W 76/02* (2009.01)
*H04N 7/14* (2006.01)

(52) U.S. Cl.
CPC ............ *H04W 76/028* (2013.01); *H04N 7/147* (2013.01)

(58) Field of Classification Search
None
See application file for complete search history.

(56) References Cited

U.S. PATENT DOCUMENTS

| 8,963,986 | B2* | 2/2015 | MacDonald | G06Q 10/10 348/14.07 |
| 9,125,141 | B1* | 9/2015 | Sanjeev | H04W 8/245 |
| 2009/0197615 | A1* | 8/2009 | Kim | H04M 1/605 455/456.1 |
| 2009/0203375 | A1* | 8/2009 | Gisby | H04W 8/30 455/426.1 |
| 2013/0094472 | A1 | 4/2013 | Klingenbrunn et al. | |
| 2013/0171975 | A1 | 7/2013 | Lindner et al. | |
| 2014/0029732 | A1* | 1/2014 | Liik | H04M 3/42195 379/32.01 |
| 2015/0188727 | A1* | 7/2015 | Bruner | H04L 12/4633 370/329 |
| 2015/0326447 | A1* | 11/2015 | Yoon | H04L 41/5025 709/224 |
| 2015/0341759 | A1* | 11/2015 | Kerger | H04L 65/4061 455/26.1 |

FOREIGN PATENT DOCUMENTS

| KR | 10-2004-0051673 | 6/2004 |
| KR | 10-2005-0075824 | 7/2005 |
| KR | 10-0601876 | 7/2006 |
| KR | 10-2006-0094342 | 8/2006 |
| KR | 10-0646228 | 11/2006 |
| KR | 10-2009-0015755 | 2/2009 |

* cited by examiner

*Primary Examiner* — Creighton Smith
(74) *Attorney, Agent, or Firm* — The Farrell Law Firm, P.C.

(57) ABSTRACT

A call service method and an apparatus are provided. The call service method of an electronic device includes detecting a communication state change with a counterpart electronic device, checking a reason for the communication state change, and performing at least one of displaying communication state information based on the reason for the communication state change and recovering a call connection.

18 Claims, 11 Drawing Sheets

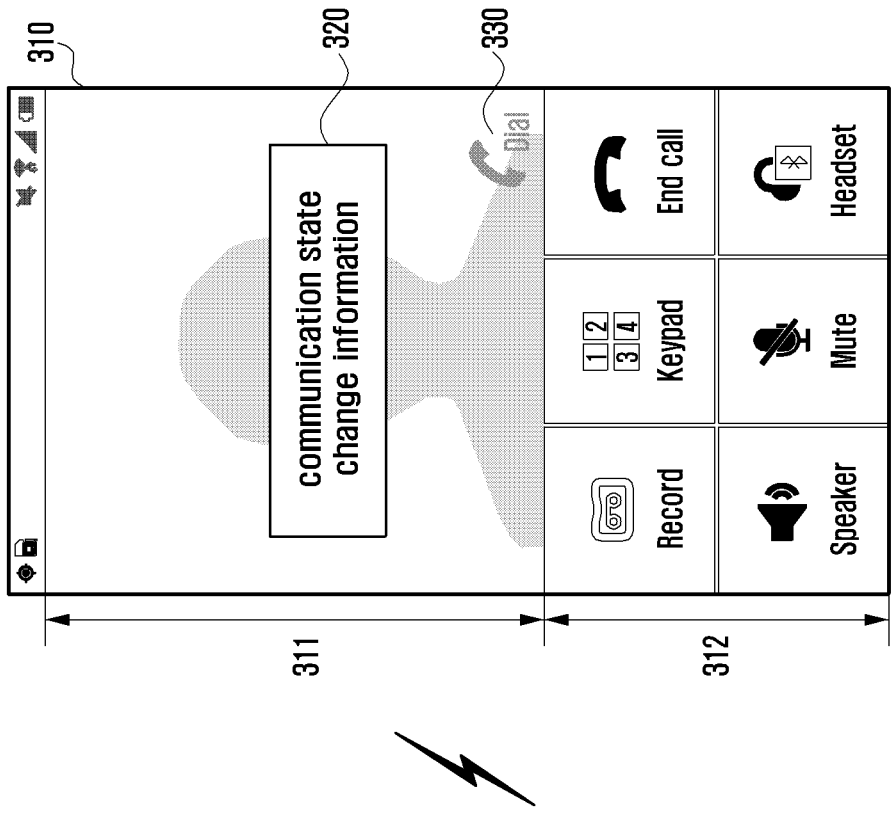
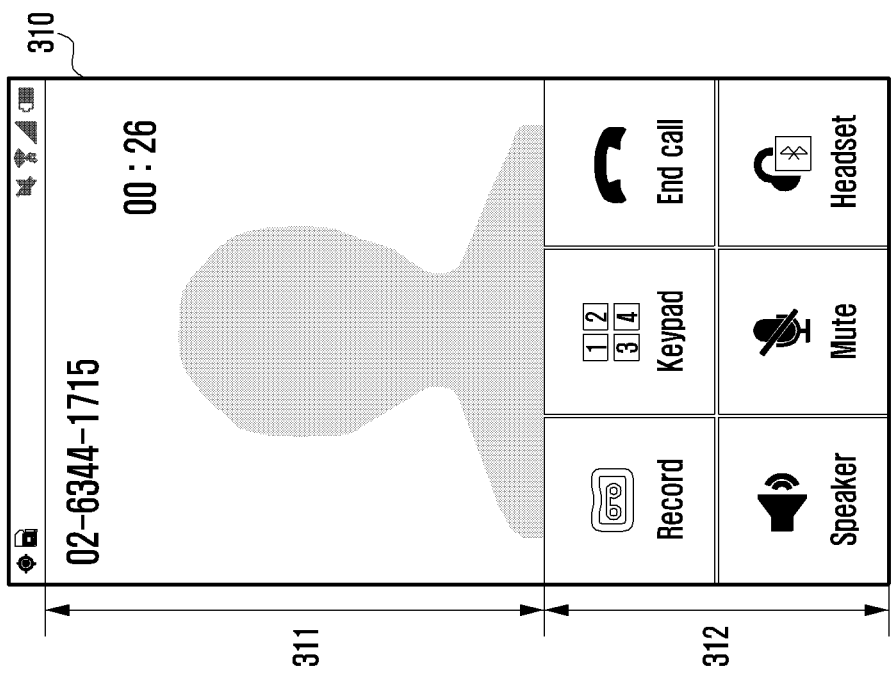
FIG. 3A / FIG. 3B

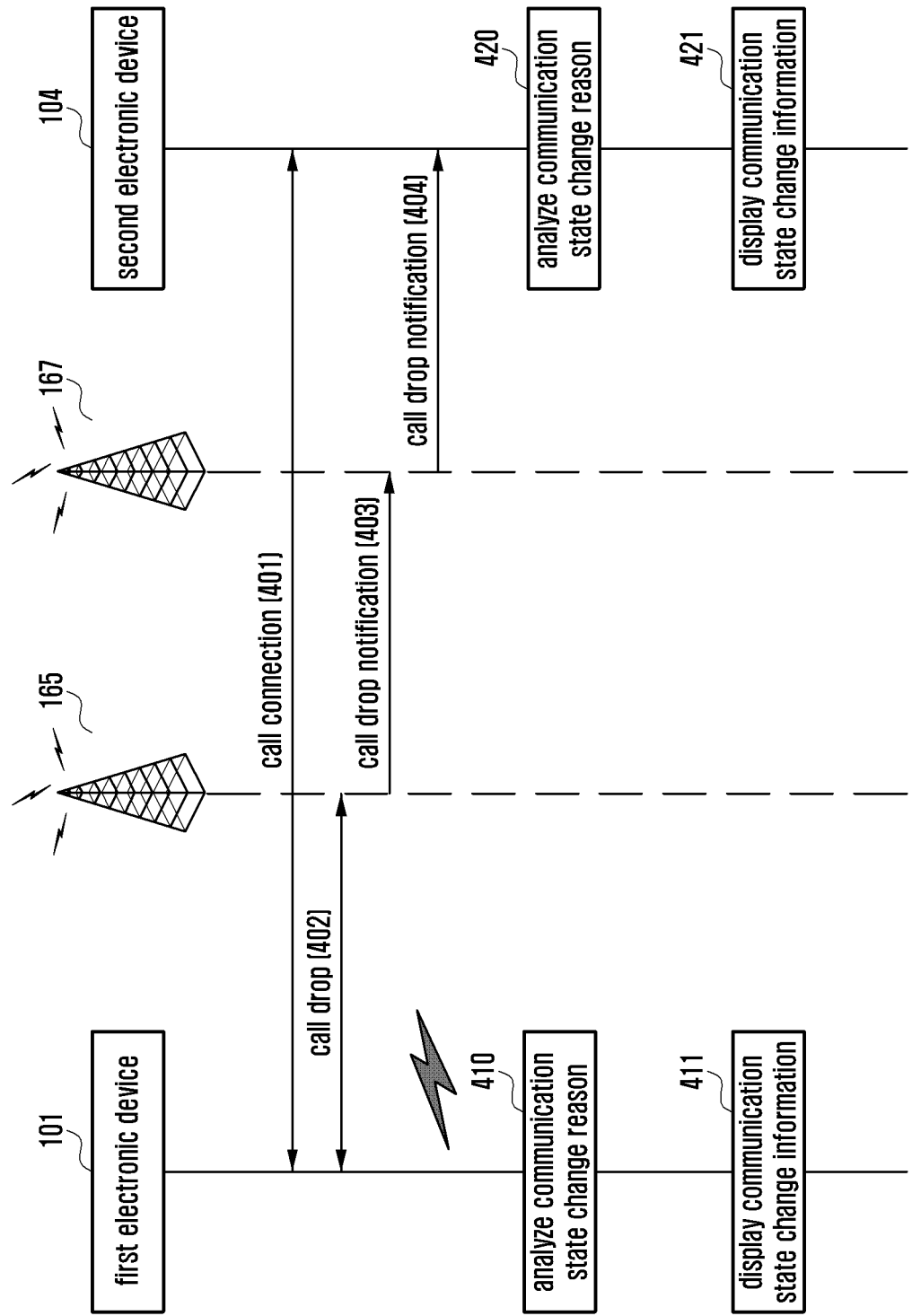

12# CALL SERVICE METHOD AND APPARATUS

PRIORITY

This application claims priority under 35 U.S.C. §119(a) to Korean Patent Application No. 10-2014-0046002, filed in the Korean Intellectual Property Office on Apr. 17, 2014, the entire contents of which are incorporated herein by reference.

BACKGROUND

1. Field of Invention

The present invention relates generally to a call service method and apparatus.

2. Description of Related Art

The wireless communication-enabled electronic device has evolved to the extent of supporting multiple communication networks. For example, recent wireless communication devices are capable of supporting Circuit Switched (CS) network-based voice call service and Packet Switched (PS) network-based data communication service (e.g. data service on LTE).

Although network operators are trying to extend their network coverage, such extension is restrictive. As a result, electronic device users are likely to experience service lags or service failure. Accordingly, a method is needed for providing the user with call service in poor communication conditions, such as when communication errors occur and when there is a reduction in the quality of the communication session over the network.

SUMMARY

The present invention has been made to address at least the problems and disadvantages described above, and to provide at least the advantages described below.

In accordance with an aspect of the present invention, a call service method of an electronic device is provided. The call service method includes detecting a communication state change with a counterpart electronic device, checking a reason for the communication state change, and performing at least one of displaying communication state information based on the reason for the communication state change and recovering a call connection.

In accordance with another aspect of the present invention, a call service method of an electronic device is provided. The call service method includes playing a streaming content received through a communication network, detecting a communication state change on the communication network, and transmitting at least part of streaming content information to a counterpart electronic device based on a reason for the communication state change.

In accordance with another aspect of the present invention, an electronic device is provided. The electronic device includes a communication unit configured to transmit and receive communication signals, a display unit configured to display communication service information, and a processor configured to detect a communication state change with a counterpart electronic device, check a reason for the communication state change, control the display unit to display communication state information on a screen based on the reason for the communication state change, and recover a call connection.

In accordance with another aspect of the present invention, an electronic device is provided. The electronic device includes an emotion analysis module configured to analyze voice data and expression data to determine an emotion of a counterpart user, and an image processing module configured to modify a still image of the counterpart user according to an emotion factor of the counterpart user, where the processor is further configured to control, when the video data is not received from the counterpart electronic device and a strength of a signal carrying the video data is equal to or less than a threshold, the display unit to display the still image of the counterpart user, the still image being modified based on the voice and expression data.

BRIEF DESCRIPTION OF THE DRAWINGS

The above and other aspects, features, and advantages of certain embodiments of the present invention will be more apparent from the following detailed description taken in conjunction with the accompanying drawings, in which:

FIGS. 3A and 3B are diagrams illustrating call service screens of the electronic device, according to an embodiment of the present invention;

FIG. 4 is a signal flow diagram illustrating a call service between two electronic devices, according to an embodiment of the present invention;

DETAILED DESCRIPTION OF EMBODIMENTS OF THE PRESENT INVENTION

Figure 1:
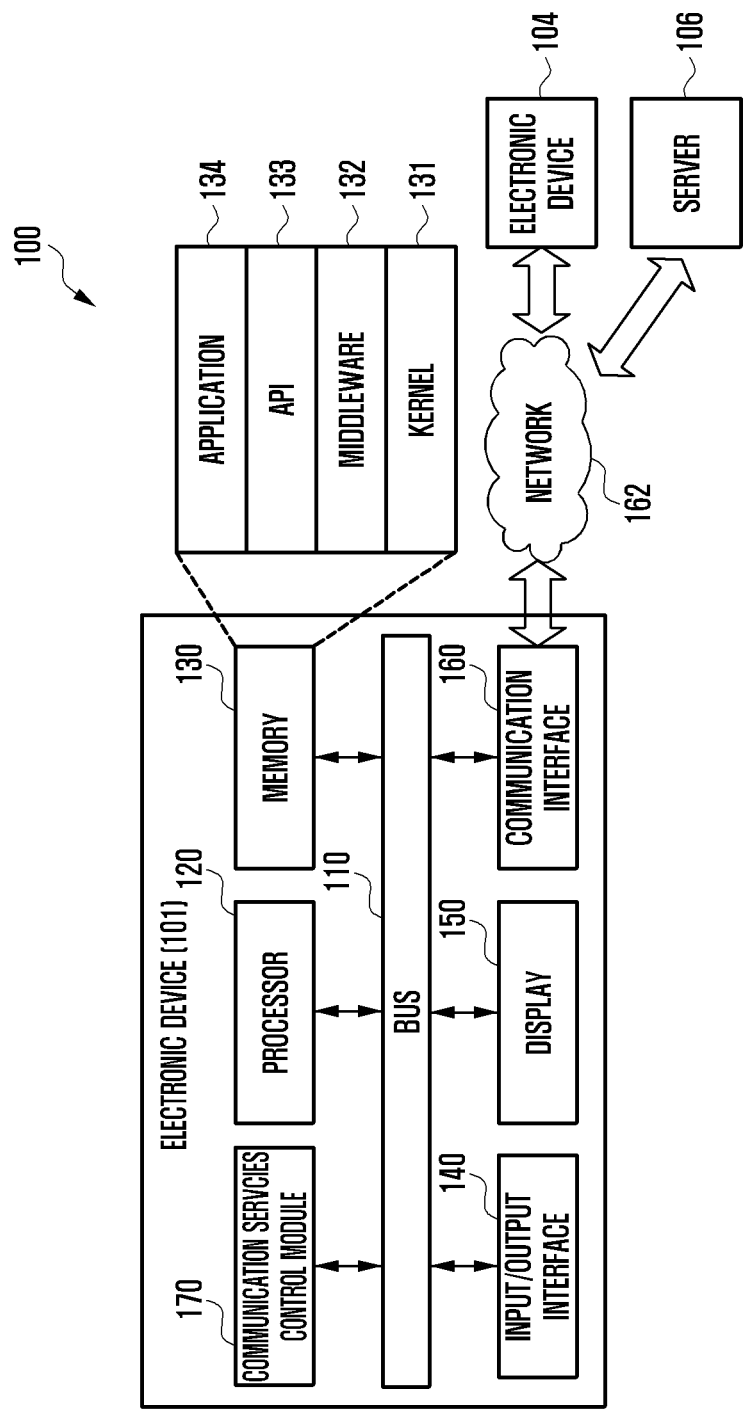
FIG. 1 is a block diagram illustrating a network environment including an electronic device, according to an embodiment of the present invention.

Hereinafter, the present invention will be described with reference to the accompanying drawings. The present invention may have various modifications and embodiments and, thus, will be described in detail with reference to the specific embodiments illustrated in the drawings. However, it should be understood that there is no intent to limit the present invention to the particular forms disclosed herein; rather, the present invention should be construed to cover all modifications, equivalents, and/or alternatives falling within the spirit and scope of the invention. In the description of the drawings, identical or similar reference numerals are used to designate identical or similar elements.

It will be understood that the expressions "comprises" and "may comprise" are used to specify presence of a disclosed function, operation, component, etc., but do not preclude the presence of one or more functions, operations, components, etc. It will be further understood that the terms "comprises" and/or "has" when used in this specification, specify the presence of a stated feature, number, step, operation, component, element, or a combination thereof, but do not preclude the presence or addition of one or more other features, numbers, steps, operations, components, elements, or combinations thereof.

In the present disclosure, the expression "and/or" is taken as specific disclosure of each and any combination of enumerated things. For example, A and/or B is to be taken as specific disclosure of each of A, B, and A and B.

As used herein, terms such as "first," "second," etc. are used to describe various components, however, the components should not be defined by these terms. For example, the terms do not restrict the order and/or importance of the corresponding components. The terms are used only for distinguishing one component from another component. For example, a first component may be referred to as a second component and likewise, a second component may also be referred to as a first component, without departing from the teaching of the inventive concept.

It will be understood that when an element or layer is referred to as being "on", "connected to," or "coupled to" another element or layer, it can be directly on, connected to, or coupled to the other element or layer or intervening elements or layers may be present. In contrast, when an element is referred to as being "directly on," "directly connected to," or "directly coupled to" another element or layer, there are no intervening elements or layers present between the two elements.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present invention, the electronic device includes devices having a communication function. Examples of the electronic device include a smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g. Head-Mounted Device (HMD), such as electronic glasses, electronic clothing, electronic bracelet, electronic necklace, electronic appcessory, electronic tattoo, smartwatch, etc.).

According to an embodiment of the present invention, the electronic device may be one of smart home appliances having operation support function. Examples of the smart electronic appliance as an electronic device include a television, Digital Versatile Disk (DVD) player, audio player, refrigerator, air-conditioner, vacuum cleaner, electronic oven, microwave oven, laundry machine, air cleaner, set-top box, TV box (e.g. Samsung HomeSync™, Apple TV™, and Google TV™), game console, electronic dictionary, electronic key, camcorder, and electronic frame, etc.

According to an embodiment of the present invention, examples of the electronic device include a medical device (e.g., Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g. maritime navigation device and gyro compass), aviation electronic device (avionics), security device, vehicle head unit, industrial or home robot, Automatic Teller Machine (ATM), Point Of Sales (POS) machine, etc.

According to an embodiment of the present invention, examples of the electronic device include furniture and a building/structure having a communication function, electronic board, electronic signature receiving device, projector, and metering device (e.g. water, electric, gas, and electric wave metering devices).

According to various embodiments, the electronic device may be any combination of the aforementioned devices. According to various embodiments of the present invention, the electronic device may be a flexible device. It should be obvious to those skilled in the art that the electronic device is not limited to the aforementioned devices.

FIG. 1 is a block diagram illustrating a network environment including an electronic device, according to an embodiment of the present invention.

Referring to FIG. 1, electronic device 101 includes a bus 110, a processor 120, a memory 130, an input/output interface 140, a display 150, a communication interface 160, and an communication service control module 170.

The bus 110 connects the aforementioned components to each other and is a circuit for exchanging signals (e.g., control messages) among the components.

The processor 120 receives a command from any of the aforementioned components (e.g., memory 130, input/output interface 140, display 150, communication interface 160, and communication service control module 170) through the bus 110, interprets the command, and executes operation or data processing according to the decrypted command.

The memory 130 stores a command or data received from the processor 120 or other components (e.g., input/output interface 140, display 150, communication interface 160, communication service control module 170, etc.) or generated by the processor 120 or other components. The memory 130 stores program modules including kernel 131, middleware 132, Application Programming Interface (API) 133, applications 134, etc. Each programming module may be implemented as software, firmware, hardware, or any combination thereof.

The kernel 131 controls or manages the system resources (e.g., the bus 110, processor 120, and memory 130) for use in executing the operation or function implemented with the middleware 132, the API 133, or the applications 134. The kernel 131 also may provide an interface allowing the middleware 132, API 133, or applications 134 to access the components of the electronic device 101 to control or manage.

The middleware 132 works as a relay of data communicated between the API 133 or application 134 and the kernel 131. The middleware 132 executes control of the task requests from the applications 134 to assign priority for use of the system resources (e.g., bus 110, processor 120, and memory 130) of the electronic device to at least one of the applications 134.

The API 133 is an interface for the applications 134 that controls the function provided by the kernel 131 or the middleware 132 and may include at least one interface or function (e.g., a command) for file control, window control, image control, or text control.

According to various embodiments of the present invention, the applications 134 include a Short Messaging Service/ Multimedia Messaging Service (SMS/MMS) application, email application, calendar application, alarm application, health care application (e.g., an application of measuring quantity of motion or blood sugar level), and environmental information application (e.g., atmospheric pressure, humidity, and temperature applications). Additionally or alternatively, the applications 134 may include an application related to information exchange between the electronic device 101 and external electronic device 104. Examples of the information an exchange application include a notification relay application for relaying specific information to the external electronic device 104 and a device management application for managing the external electronic device.

For example, the notification relay application is provided with a function of relaying the alarm information generated by the other applications (e.g. SMS/MMS application, email application, health care application, and environmental information application) of the electronic device 101 to an external electronic device 104. Additionally or alternatively, the notification relay application provides the user with the notification information received from an external electronic device 104.

The device management application manages (e.g. installs, deletes, and updates) the function of an external electronic device 104 (e.g. turn-on/off the external electronic device 104 or a part of the external electronic device 104 or adjust the brightness (or resolution) of the display) which communicates with the electronic device 101 or the service (e.g. communication or messaging service) provided by the external electronic device 104 or an application running on the external electronic device 104.

According to various embodiments of the present invention, the applications 134 may include an application designated according to the property (e.g., a type) of an external electronic device 104. For example, if the external electronic device 104 is the MP3 player, the applications 134 may include a music playback application. Similarly, if the external electronic device 104 is a mobile medical appliance, the applications 134 may include a health care application.

According to an embodiment of the present invention, the applications 134 may include at least one of applications designated to the electronic device 101 and applications received from the external electronic device 104 or a server 106.

The input/output interface 140 delivers a command or data input by the user through with an input/output device (e.g., a sensor, a keyboard, or touchscreen) to the processor 120, memory 130, communication interface 160, and/or communication service control module 170 through the bus 110. For example, the input/output interface 140 provides the processor 120 with the data corresponding to the touch input on the touchscreen by the user. The input/output interface 140 outputs a command or data (which is received from the processor 120, memory 130, communication interfaced 160, or communication service control module 170 through the bus 110) through the input/output device (e.g., a speaker and/or a display). For example, the input/out interface 140 outputs the voice data processed by the processor 120 to the user through the speaker.

The display 150 may present various information to the user (e.g., multimedia data and text data).

The communication interface 160 establishes a communication connection between the electronic device 101 and an external device (e.g., the electronic device 104 and the server 106). For example, the communication interface 160 connects to the network 162 through a wireless or wired link for communication with the external device.

Examples of wireless communication technology include Wi-Fi, Bluetooth (BT), Near Field Communication (NFC), Global Positioning System (GPS), and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and Global System for Mobile (GSM) communications).

Examples of wired communication technology include Universal Serial Bus (USB), High Definition Multimedia Interface (HDMI), Recommended Standard 232 (RS-232), and Plain Old Telephone Service (POTS).

According to an embodiment of the present invention, the network 162 is a telecommunication network. The communication network includes at least one of a computer network, the Internet, the Internet of Things, and a telephone network.

According to an embodiment of the present invention, the communication protocol (e.g. transport layer protocol, data link layer protocol, and physical layer protocol) between the electronic device 101 and an external device may be supported by at least one of the applications 134, API 133, middleware 132, kernel 131, and communication interface 160.

According to an embodiment of the present invention, the electronic device 101 connects to a base station through a network. The base station is a fixed station communicating with the electronic device 101 and can be interchangeably referred to as evolved Node B (eNB) and Base Transceiver System (BTS). The base station connects to the core network of the wireless communication system supporting the call service.

The base station sends the electronic device 101 a communication signal concerning a call connection with another electronic device. Examples of the communication signal include a call connection request signal, a call connection response signal, and a communication termination signal.

The communication service control module 170 processes at least part of the information acquired from other components (e.g., the processor 120, the memory 130, the input/out interface 140, and the communication interface 160) and presents the processing result to the user in various manners. For example, the communication service control module 170 controls at least part of the functions of the electronic device 101 for interoperation the external electronic device 104 and server 106 using the processor 120 or independently of the processor 120.

Figure 2:
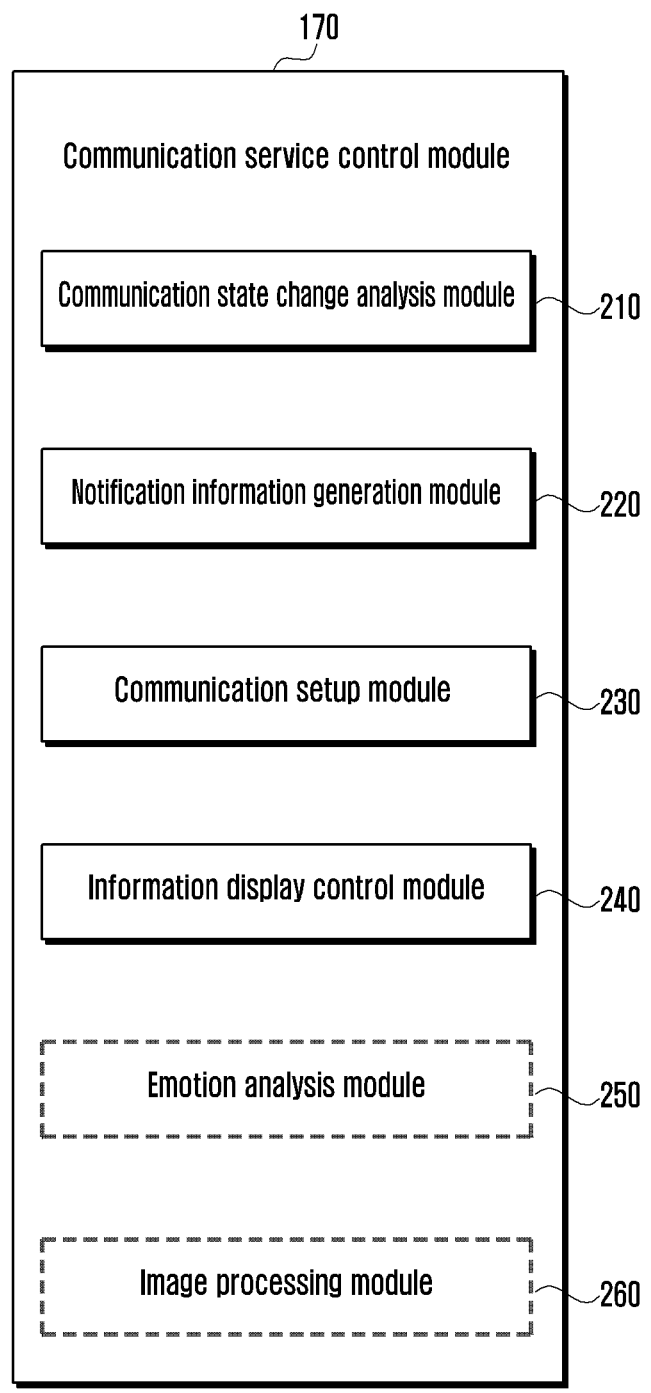
FIG. 2 is a block diagram illustrating a configuration of a call service control module of the electronic device, according to an embodiment of the present invention.

FIG. 2 is a block diagram illustrating a configuration of a communication service control module 170 of the electronic device, according to an embodiment of the present invention.

Referring to FIG. 2, the communication service control module 170 of the electronic device 101 is provided. The communication service control module 170 includes a communication state change analysis module 210, a notification information generation module 220, a communication setup module 230, and an information display control module 240. According to an embodiment of the present invention, the communication service control module 170 may also include an emotion analysis module 250 and an image processing module 260.

The communication state change analysis module 210 analyzes communication signals exchanged between the electronic device 101 and the base station supporting the network service. The communication state change analysis module 210 checks the reason for a change of the communication state based on the communication signal information, i.e. whether the connection between the electronic device 101 and the base station has been dropped, whether the connection between a counterpart electronic device (i.e., a second electronic device with which the electronic device 101 communicates, such as external electronic device 104) and the base station has been dropped, whether the call service information of the counterpart electronic device has changed, or whether the electronic device 101 is out of the cell coverage area of the base station.

According to an embodiment of the present invention, the communication state change analysis module 210 checks the communication state change information based on the error code included in the communication signal received from the base station, i.e. the call end signal. For example, the electronic device 101 establishes a connection with another electronic device (i.e. the counterpart electronic device) via the base station and exchanges communication signals or communication messages with the base station. In this case, the communication signal may include base station identity information, cell coverage information, and communication signal strength information.

The communication state change analysis module 210 determines the termination of the communication based on a predetermined input signal (e.g., an end button input signal or an end gesture input signal). If the communication is terminated in response to the predetermined input signal, the communication state change analysis module 210 analyses that the communication is terminated according to the user's intention and, otherwise if the communication is terminated without receiving a predetermined input signal, the communication state change analysis module 210 analyses that the communication is terminated without the user's intention.

The notification information generation module 220 generates notification information which informs the user of the communication termination information or communication quality degradation information based on the communication state change information. The notification information may be provided with a visual effect (e.g., signal strength indicator, still image, motion image, or animation showing the breakage of the connection with the base station), a sound effect (e.g., beeping or alarm sound), illumination effect (e.g., LCD blinking), and/or a vibration effect.

The notification information generation module 220 generates the notification information to provide the counterpart electronic device with the information on the currently running function or currently playing content when the communication is terminated without the user's intention. For example, if the communication is broken without the user's intention in the middle of playing the streaming content provided by a server, the electronic device 101 generates the notification information based on the streaming content information and the access account information of the server providing the streaming service.

When the call connection with the counterpart electronic device drops, the communication setup module 230 may re-request for connection setup with the counterpart electronic device. The communication setup module 230 requests for the connection setup with the counterpart electronic device through a network different from the network on which the connection has been broken. For example, if the connection with the counterpart electronic device through the LTE network has been broken without the user's intention, the electronic device requests for connection setup with a communication network (e.g. 3G and Wi-Fi networks) different than the LTE network.

The information display control module 240 controls the display to display the notification information (e.g. communication termination information and communication quality degradation information) generated by the notification information generation module 220. The information display control module 240 controls the display to display the communication reestablishment information (e.g. an icon) when the communication has been terminated without the user's intention.

According to an embodiment of the present invention, when communication is reestablished, the information display control module 240 controls to display a visual effect expressing that communication has been established using a stored data (e.g, image) According to an embodiment of the present invention, the information display control module 240 controls to display information on call services available for the counterpart electronic device corresponding to a contact item included in a contact list or communication list stored in the electronic device 101. Specifically, the information display control module 240 acquires, from a server which collects information on electronic devices, the available call services associated with the identity information of the counterpart electronic device stored in the electronic device 101. The information display control module 240 also controls to display, along with the information on the available call services for the counterpart electronic device, the contact information of the user of the counterpart electronic device (i.e. the counterpart user) based on the acquired available call service information.

The electronic device performs video communication by transmitting/receiving video and voice data to/from the counterpart electronic device. If the electronic device is out of the cell coverage, if the newly connected network supports only the voice call, or if the communication quality becomes degraded, the video data may not be transmitted/received.

When it is determined that the video communication with the counterpart electronic device no longer available, the emotion analysis module 250 determines an emotion of the counterpart user by analyzing voice and expression data received from the counterpart electronic device. For example, the emotion analysis module 250 analyzes at least one of the rhythm of the voice, voice frequency, and data acquired by numeralizing the changes of eyes, nose, mouse, and countenance received from the counterpart electronic device and calculates numeric data to extract an emotion factor.

If it is determined that the video communication with the counterpart electronic device is not available, the image processing module 260 selects an image of the counterpart user and controls to display the image. The image processing module 260 may select the image of the counterpart user from among images buffered during the video communication or images stored in association with the counterpart user (e.g., a profile photo stored along with the contact item or associated with a social network service).

The image processing module 260 may process the images of the counterpart user to express the analyzed counterpart user's emotion. For example, the image processing module 260 analyzes the voice and expression data and, when it is determined that the counterpart user is happy, change the shapes of the eyes and sides of the mouth of the counterpart user's face to emulate smiling. If it is determined that the counterpart user is speaking based on the voice and expression data, the image processing module 260 animates the mouth region to emulate talking on the counterpart user's image. The electronic device 101 may further include a short range communication module (e.g., Bluetooth, Bluetooth Low Energy (BLE), Zigbee, Wi-Fi, Device to Device (D2D)). The communication module may transmit information related to streaming content (i.e. the music) received from a server to a counterpart electronic device. When a communication state change is detected at least part of the streaming content may be transmitted to the counterpart electronic device.

If it is determined that communication is terminated without the user's intention, the electronic device 101 requests connection for a streaming to the counterpart electronic device. When a signal is received from the counterpart electronic device permitting the streaming connection from the counterpart electronic device, the electronic device 101 transmits to the counterpart electronic device server access account information and at least part of the streaming content in response to the permission signal.

FIGS. 3A and 3B are diagrams illustrating call service screens of the electronic device, according to an embodiment of the present invention.

Referring to FIGS. 3A and 3B, the electronic device 101 performs call connection with a counterpart electronic device. If the electronic device 101 initiates the call connection with the counterpart electronic device, a call connection screen 310 is displayed on the screen, as shown in FIG. 3A. The call connection screen 310 includes a counterpart information display region 311 and a call function region 312. The counterpart information display region 311 displays the counterpart electronic device identity information (e.g., a phone number), a picture of the counterpart user, and call connection time. The call function region 213 displays the call-related functions provided by the electronic device 101 (e.g., a recording function, a sound mute function, a communication mode switching function, and a call connection termination function).

If it is determined that the call connection drops without the user's intention or the communication quality is degraded based on the communication signal received from the base station in the call connection process, the electronic device 101 displays a communication state change notification object in the counterpart information display region 311, as shown in FIG. 3B. Although the communication state change information 320 is arranged at the center of the screen in FIG. 3B, the communication state change information may also be arranged on another part of the screen, such as at a top, bottom, left, and right side of the counterpart information display region 311. The communication state change information 320 includes information on the communication breakage between the electronic device 101 and base station and signal strength information (e.g., counterpart antenna received signal strength). The notification object of the communication state change information 320 may be generated in the form of a text, an image, or an icon but is not limited thereto.

According to an embodiment, when the call drops without the user's intention, the electronic device 101 displays a reconnection object (e.g., a redial icon) 330. When the call drops without the user's intention, to the user of the electronic device 101 may request that the connection with the counterpart electronic device be reestablished by means of the reconnection object 330.

According to an embodiment, when the call drops without the user's intention, the electronic device 101 automatically sends a request to the counterpart electronic to reestablish the connection and presents a connection reestablishment attempt notification (e.g., "trying to re-establish the connection") to the user.

FIG. 4 is a signal flow diagram illustrating a call service between two electronic devices, according to an embodiment of the present invention.

Referring to FIG. 4, the first electronic device 101 connects to the first base station 165. The second electronic device 104 connects to the second base station 167 (the second electronic device 104 may alternatively connect to the first base station 165). The first and second base stations 165 and 167 relay the signals exchanged between the first electronic device 101 and second electronic device 104 via a core network.

The first electronic device 101 and second electronic device 104 establish a connection for communication via at least one of first base station 165 and second base station 167). For example, the first electronic device 101 and second electronic device 104 establishes a communication channel at step 401. The first electronic device 101 transmits communication signals to the first base station 165 through the communication channel. The second electronic device 104 transmits communication signals to the second base station 167. The first base station 165 relays the communication signal transmitted by the first electronic device 101 to the second electronic device 104 via the second base station 167 connected to the second electronic device 104. The second base station 167 relays the communication signal transmitted by the second electronic device 104 to the first electronic device 101 via the first base station 165.

At step 402, the call connection between the first electronic device 101 and the first base station 165 drops. For example, if the first electronic device 101 may move out of the cell coverage area of the first base station 165 or experience interference, the call connection with the first base station 165 may dropped (e.g., the link cutoff). The first electronic device 101 checks the communication state change based on the communication signal strength before the call connection with the first base station 165 drops.

If the call connection with the first electronic device 101 drops, the first base station 165 notifies the second base station 167 of the call connection drop via the core network at step 403. That is, the first electronic device 101 sends call drop notification information to the second base station 167, including termination code information at step 404.

The first base station 165 sets the termination code information differently depending on whether the call connection is terminated in response to the request from the first electronic device 101, the first electronic device 101 moves out of the cell coverage, or the signal strength drops.

The second base station 167 forwards the call drop notification information received from the first base station 165 to the second electronic device 104.

If the call connection with the second electronic device 104 drops, the first electronic device 101 checks the reason of the change of the communication state at step 410. The first electronic device 101 configures the screen depending on the communication state change reason and displays the screen by means of the display unit at step 411. For example, when the call connection drops without the user's intention, the first electronic device 101 displays a screen configured for requesting the counterpart electronic device for re-establishment of the connection.

If the call drop notification information is received from the second base station 167, the second electronic device 104 analyzes the communication state change reason based on the call drop notification information at step 420. The second electronic device 104 checks whether the call connection is terminated with or without the user's intention, based on the drop code information included in the call drop notification information. The second electronic device 104 generates a screen based on the communication state change reason and displays the screen by means of the display unit at step 421. For example, if the call connection drops without the user's intention, the second electronic device 104 maintains the call connection screen.

Figure 5:
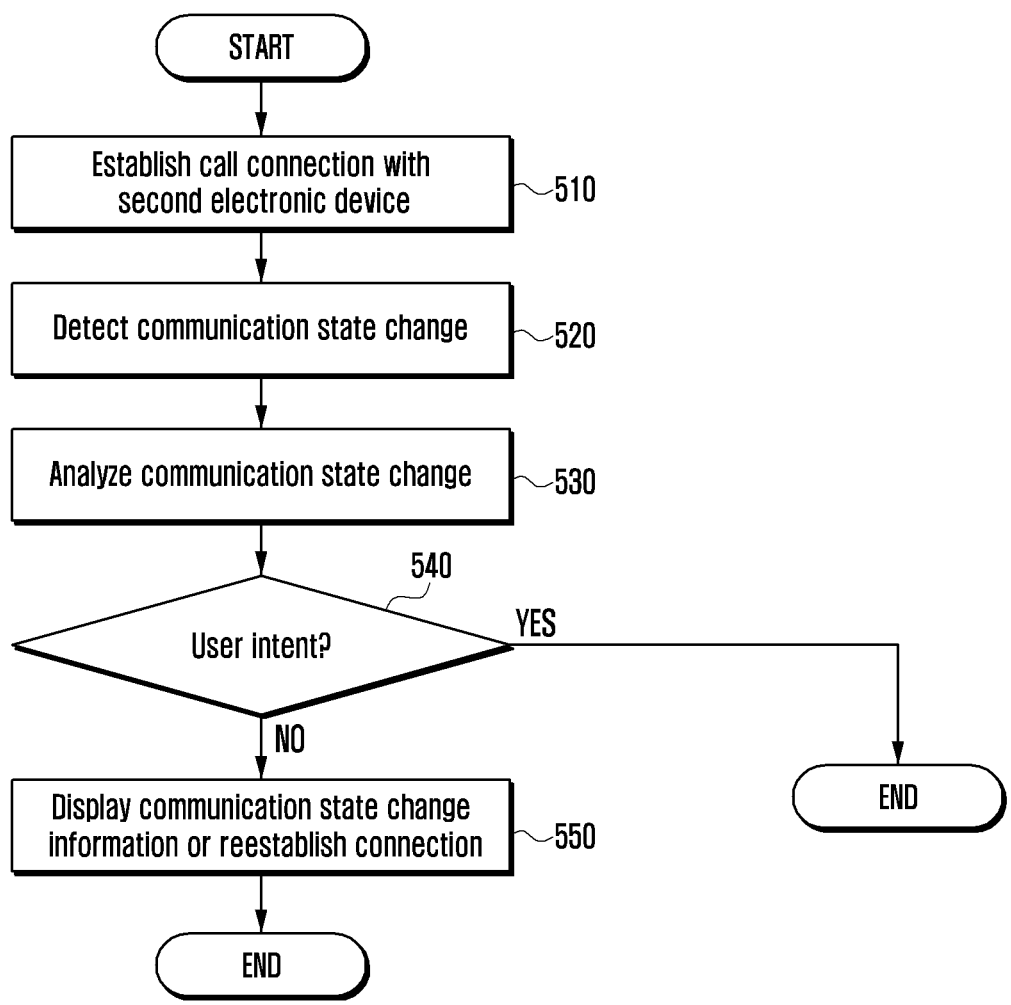
FIG. 5 is a flowchart illustrating a call service method of an electronic device, according to an embodiment of the present invention.

FIG. 5 is a flowchart illustrating a call service method of an electronic device, according to an embodiment of the present invention.

Referring to FIG. 5, the first electronic device 101 establishes a call connection with the second electronic device 104 at step 501. The first electronic device detects a change of the connection state based on the communication signal at step 520. For example, the first electronic device 101 checks if the connection is cut off in the middle of the communication, if the communication signal strength drops below a predetermined threshold, or if interference occurs.

If the communication state changes, the first electronic device 101 analyzes the reason of the communication state change at step 530. The first electronic device 101 checks if the link established to the base station on which the first electronic device 101 has camped has been dropped, if the link between the second electronic device 104 and the base station on which the second electronic device 104 has camped has dropped, if the communication is terminated in response to a preconfigured termination request signal, or if the communication signal strength has changed, based on the communication signal.

The first electronic device 101 determines whether the call connection is cut off according to the user's intention at step 540 In the case that the communication is terminated by a predetermined input signal (e.g., an end button input signal or an end gesture input signal), the first electronic device 101 determines that the communication is terminated according to the user's intention and, otherwise if the communication is terminated without the user's intention, the first electronic device 101 determines that the communication is terminated in opposition to the user's intention.

If the call connection drops in opposition to the user's intention, the first electronic device 101 displays communication state change information associated with the communication state change reason and requests for reestablishment of the call connection (i.e., redials the second electronic device 104).

Figure 6:
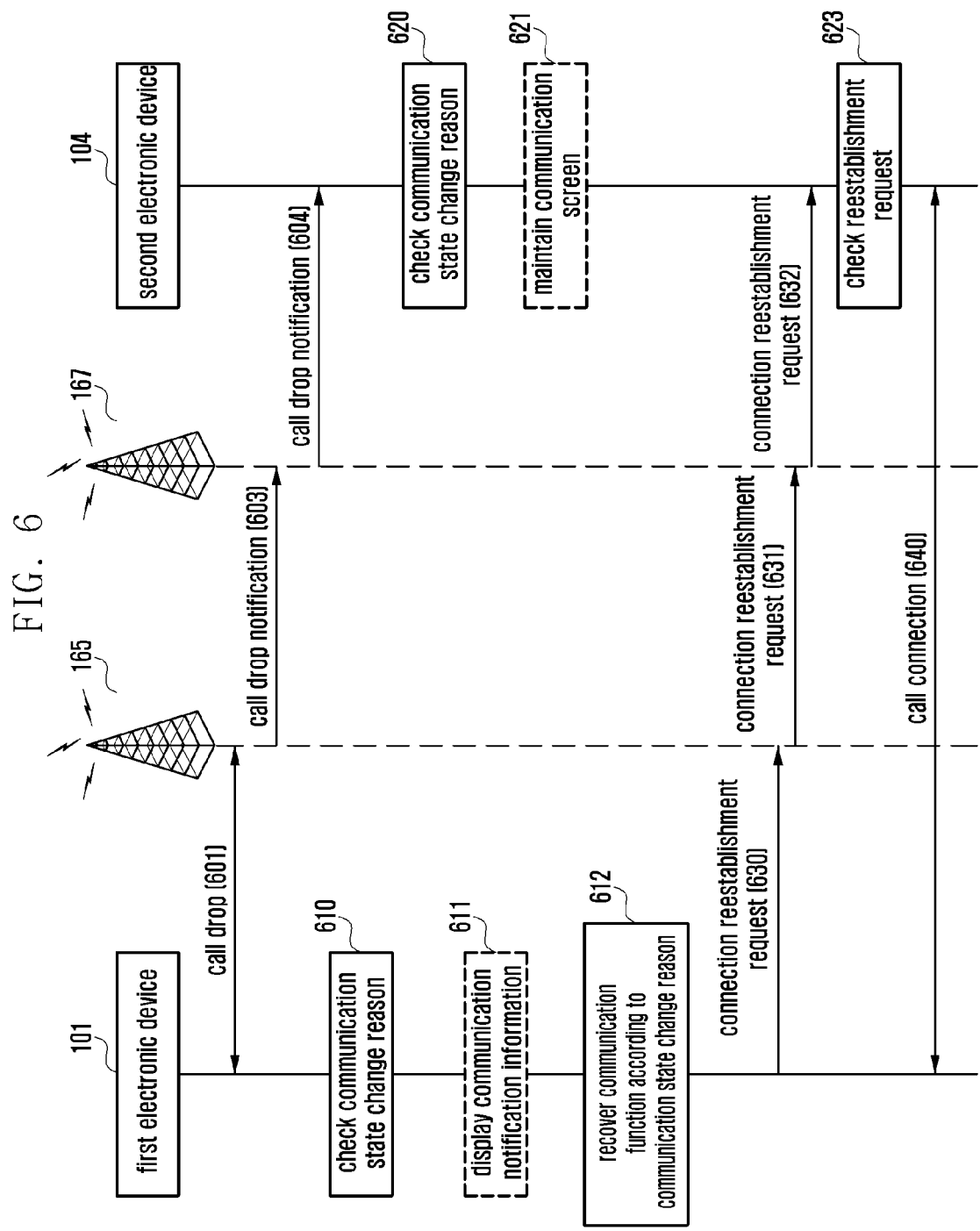
FIG. 6 is a signal flow diagram illustrating a call service between two electronic devices, according to another embodiment of the present invention.

FIG. 6 is a signal flow diagram illustrating a call service between two electronic devices, according to another embodiment of the present invention.

Referring to FIG. 6, a call connection drop occurs at step 601 in the middle of communication between the first electronic device 101 and the second electronic device 104. For example, the connection link between the first electronic device 101 and the first base station 165 may be cut off. The first base station 165 sends a call drop notification information to the second base station 167 through a core network at step 603. Then the second base station 167 sends the call drop notification information to the second electronic device 104 at step 604.

The first electronic device 101 checks the communication state change reason at step 610. The first electronic device 101 may display a communication notification information based on the communication state change reason at step 611.

The electronic device 101 recovers the communication function according to the communication change reason at step 612. In the case that the call drops without the user's intention, the first electronic device 101 requests for reestablishment of the connection with the second electronic device 104 by transmitting a connection reestablishment request at step 630. The first base station 165 sends the connection reestablishment request to the second base station 167 at step 631. The second base station 167 forwards the communication reestablishment request to the second electronic device 104 at step 632.

The second electronic device 104 checks the communication change reason based on the call drop notification information at step 620. In this case, the second electronic device 104 displays on the screen the information notifying that the connection with the first electronic device has dropped.

If it is determined, based on the termination code information included in the call drop notification information, that the call has dropped without the user's intention, the second electronic device 104 may maintain the call connection screen on the display at step 621. Step 621 may be omitted, and the information notifying connection reestablishment request from the first electronic device 101 may be provided instead of the call connection screen.

If a connection reestablishment request signal is received from the first electronic device 101, the second electronic device 104 checks the reestablishment request at step 623. In an embodiment of the present invention, if the reestablishment request is received from the first electronic device 101 in the state of maintaining the communication screen of the second electronic device 104, the second electronic device 104 outputs a notification of the receipt of the reestablishment request. For example, the second electronic device 104 notifies the user of the information on the receipt of the reestablishment request with at least one of vibration effect, sound effect, and illumination effect, and displays an item for accepting the reestablishment request on the communication screen of the second electronic device 104. The second electronic device 104 reestablishes the connection with the first electronic device 101 if the item for accepting the reestablishment request is selected, or if a signal responding to a request signal is input, or automatically. The second electronic device 104 checks whether the sender of the connection reestablishment request is the first electronic device 101. If it is determined that the sender of the connection reestablishment request is the first electronic device 101, the second electronic device 104 reestablishes the connection.

Figure 7B:
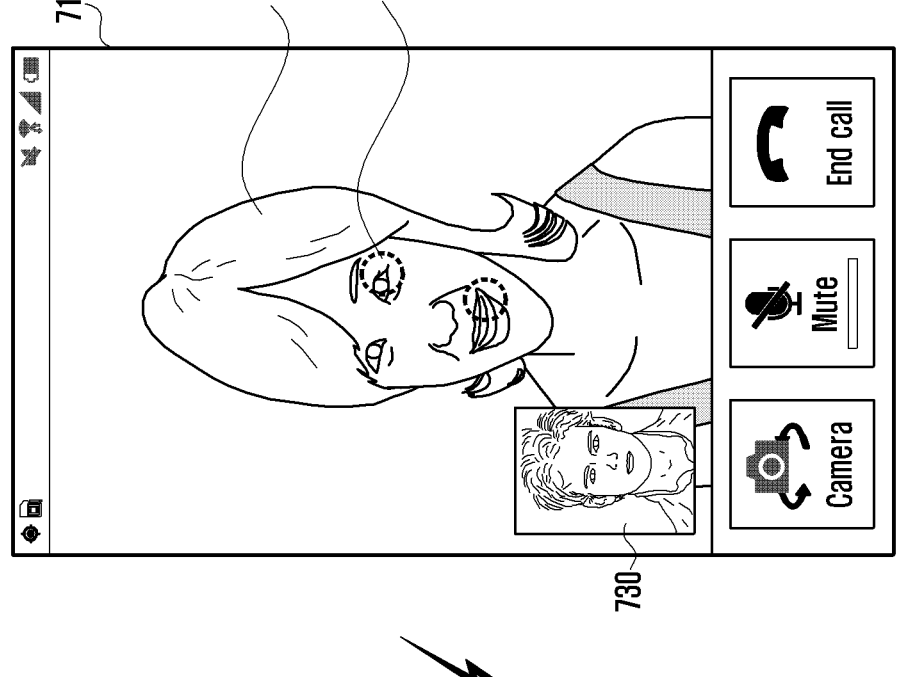
FIGS. 7A and 7B are diagrams illustrating call service execution screens of the electronic device, according to an embodiment of the present invention.
Figure 7A:
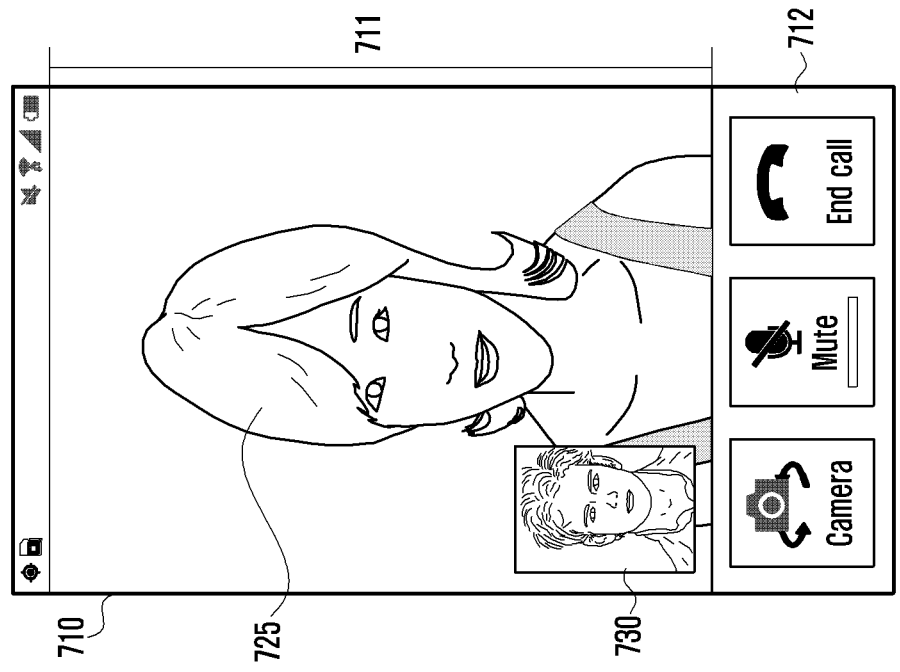

FIGS. 7A and 7B is a diagram illustrating call service execution screens of the electronic device, according to an embodiment of the present invention.

Referring to FIGS. 7A and 7B, the electronic device 101 changes the call connection screen according to the change of the communication state. The electronic device 101 configures the video call screen 710 with the user image collected through a camera and the counterpart user image received from the counterpart electronic device and displays the screen on the display unit.

The user of the electronic device 101 performs video communication with the counterpart user. FIG. 7A shows a video call screen 710 including a user and counterpart user display region 711 and a communication function region 712. In the video call screen 710, the counterpart user image 725 is received from the counterpart electronic device, and the user image 730 is a moving image of the user of the electronic device 101 input through the camera.

When the call connection drops without the user's intention, the electronic device 101 reestablishes the connection with the counterpart electronic device through the connection reestablish request operation. The connection may be reestablished between the two electronic devices through a communication network which does not support video communication. If there is no video data through the reestablished connection, a still image of the counterpart user (e.g., a photo) may be selected. The electronic device 101 displays the selected counterpart user's still image 725 on the video call screen 710, as shown in FIG. 7B.

In the voice call service, the electronic device 101 analyzes the voice data and expression data of the counterpart user and processes the face of counterpart user image based on the analyzed emotion of the counterpart user. For example, the electronic device 101 checks the emotion of the counterpart user based on the voice data and expression data and extracts regions of the still image 725 capable of expressing emotion. The electronic device processes the image to change, for example, the shape of the eyes and sides of the mouth of the counterpart user's face to emulate a certain expression. In this way, the user of the electronic device 101 feels as if he/she is communicating with the counterpart user through the video call service.

Figure 8:
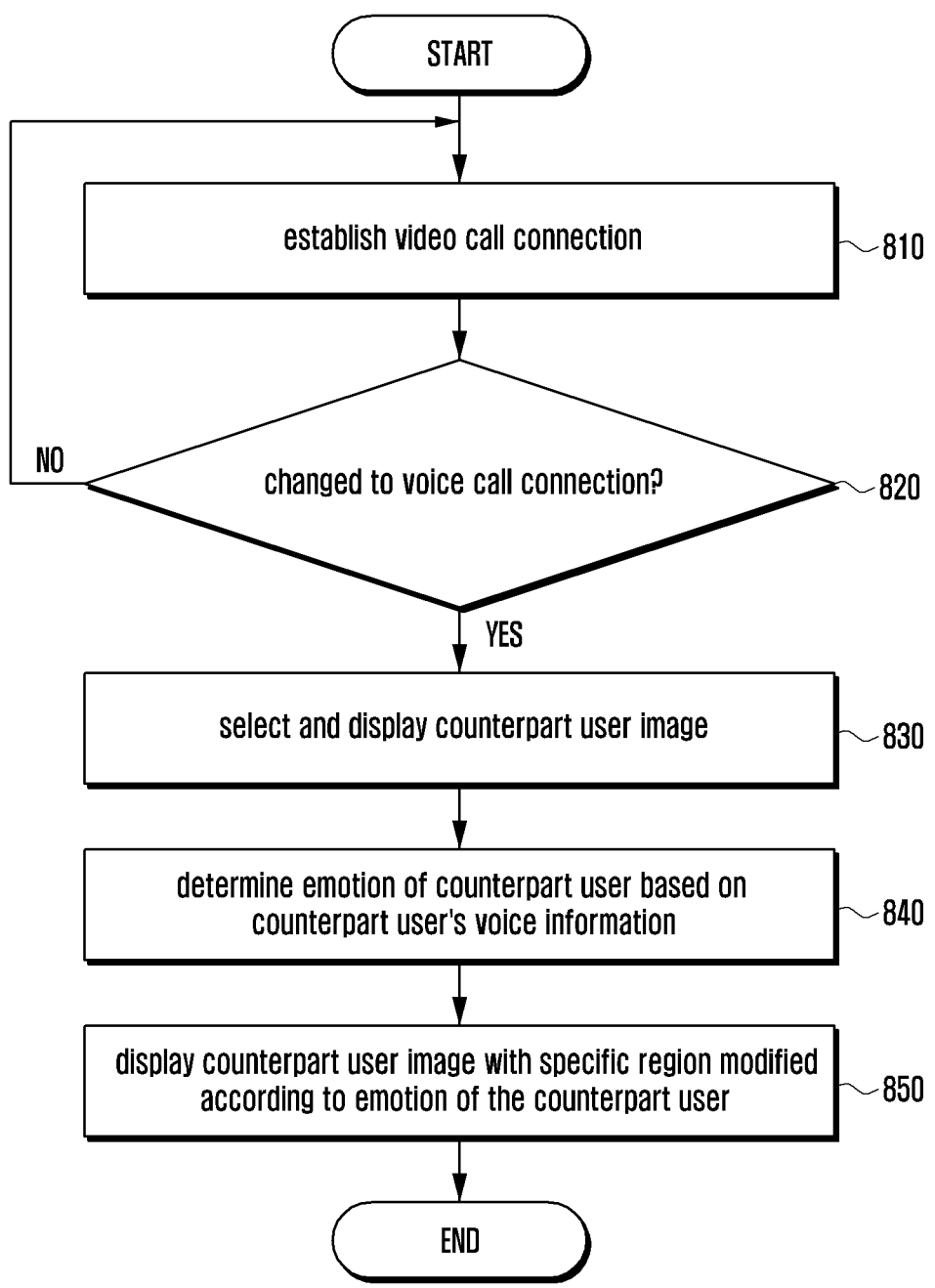
FIG. 8 is a flowchart illustrating a call service method of an electronic device, according to another embodiment of the present invention.

FIG. 8 is a flowchart illustrating a call service method of an electronic device, according to another embodiment of the present invention.

Referring to FIG. 8, the first electronic device 101 establishes a video call connection for communicating video and voice data with a second electronic device 104, at step 810. When the call connection established with the second electronic device 104 drops in the middle of the video call session, the first electronic device 101 reestablishes the connection. The first electronic device 101 receives the voice data, but not the video data. For example, the first electronic device 101 which has communicated with the second electronic device 104 through a first communication network supporting both the voice and video calls (e.g. LTE and 3G networks) may experience a call connection drop and re-establish the connection with the second electronic device 104 through a second communication network supporting only a voice call (e.g. 2G; Wi-Fi, and 3G network not supporting a video call).

The first electronic device 101 determines whether the video call is switched to the voice call at step 820. If the video call is switched to the voice call, the first electronic device 101 selects a picture of the counterpart user at step 830. The selected image is an image associated with the identity information of the second electronic device 104 (e.g., a profile image stored in association with contact information for the second electronic device 104 or an image included in a social network service). The second electronic device 104 may then send the first electronic device 101 the expression data of the user of the second electronic device 104.

The electronic device determines the emotion of the counterpart user of the second electronic device 104 based on the voice data and expression data at step 840. For example, the electronic device 101 analyzes the rhythm of the voice or the voice frequency to generate numeric data. The electronic device 101 analyzes the expression data transmitted by the second electronic device 104 to extract the emotion factor of the counterpart user. The electronic device 101 extracts the facial region from the counterpart user's image and compares the facial region with a template for expression analysis to determine the emotion factor of the counterpart user.

The electronic device 101 processes the counterpart user's image to change specific regions of the image by reflecting the analyzed counterpart user's emotion. The processed image is displayed at step 850. For example, the electronic device 101 analyzes the voice and expression data and, if it is determined that the counterpart user's emotion is delight, the electronic device 101 changes the eyes and/or sides of the mouth in the counterpart user's image to emulate smiling. Also, if it is determined that the counterpart user is speaking, based on the voice and expression data, the electronic device 101 animates the mouth in the counterpart user's image to emulate talking.

Figure 9:
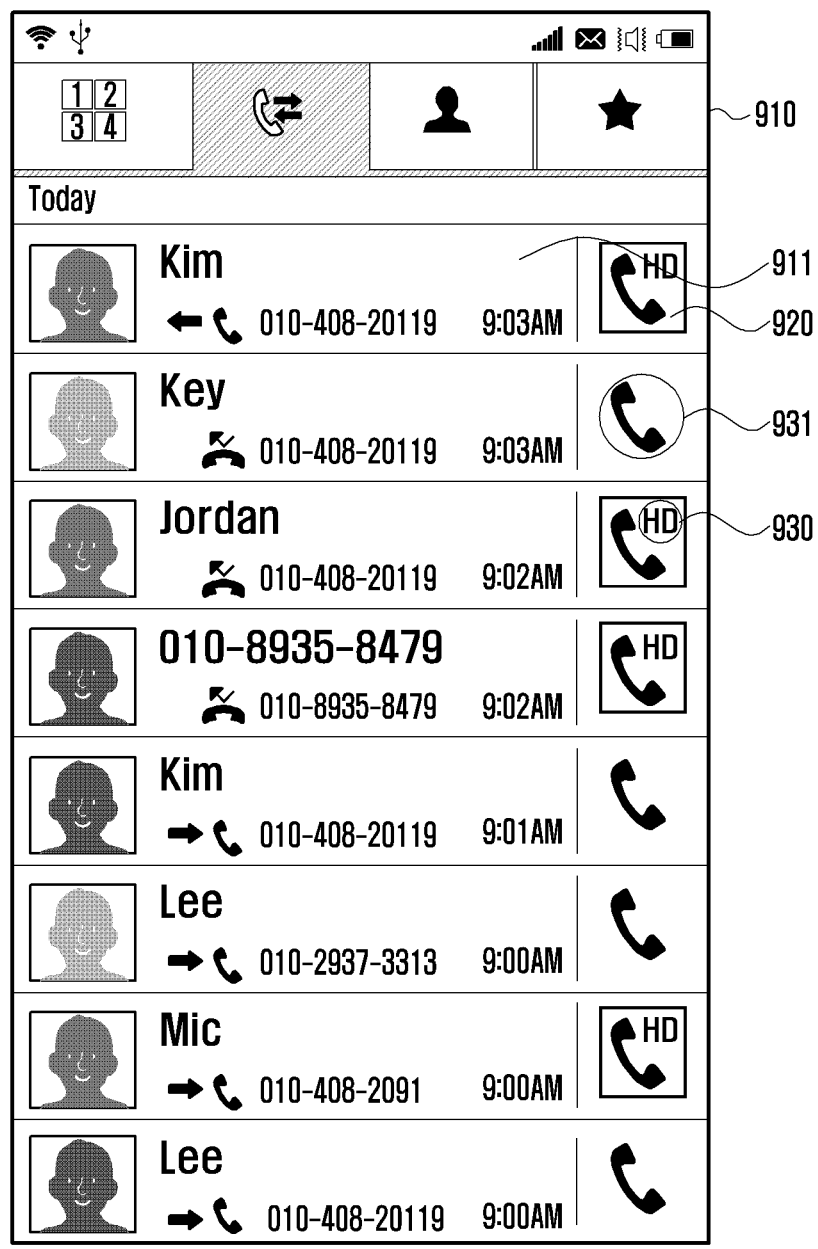
FIG. 9 is a diagram illustrating a call service execution screen of the electronic device, according to an embodiment of the present invention.

FIG. 9 is a diagram illustrating a call service execution screen of the electronic device, according to an embodiment of the present invention.

Referring to FIG. 9, the electronic device 101 displays the call service information associated with the counterpart electronic device. For example, the electronic device 101 displays a communication list screen or a contact list screen 910 on the display unit. The electronic device 101 displays counterpart identity information 911 of the communication list or the contact list. The electronic device 101 displays, adjacent to each counterpart identity information 911, call service information 930 indicating the type of call service available for the corresponding counterpart electronic device.

The electronic device 101 acquires the available call service information concerning the counterpart identity information 911 stored in the electronic device 101 from a server collecting electronic device information. The electronic device 101 displays the information on the available call service for communication with the counterpart user along with the counterpart identity information 911, based on the acquired available communication information.

For example, if it is determined that the counterpart electronic device is located in an area in which the video communication is available, the electronic device displays the contact list in which the contact item corresponding to the counterpart user is provided with the call service information 930 which indicates a video call availability indicator. The electronic device may configure the contact list screen 910 such that users for counterpart electronic devices available for voice calls and users for counterpart electronic devices available for video call, are distinguished with different call service information 931 and 930.

Figure 10:
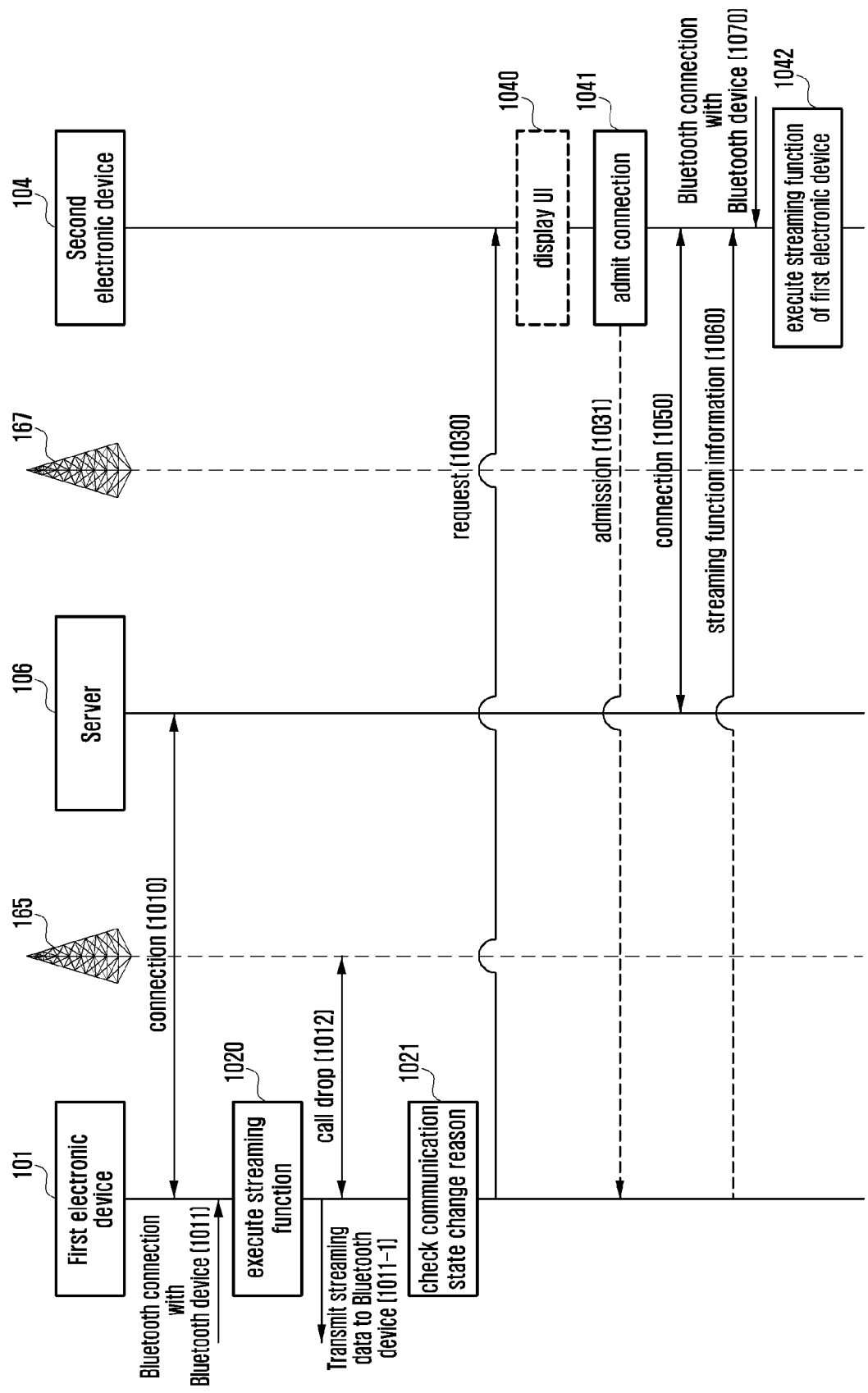
FIG. 10 is a signal flow diagram illustrating a call service between two electronic devices, according to another embodiment of the present invention.

FIG. 10 is a signal flow diagram illustrating a call service between two electronic devices, according to another embodiment of the present invention.

Referring to FIG. 10, the first electronic device 101 connects to the server via the first base station 165 at step 1010. The server 106 provides a streaming service. The first electronic device 101 requests the server 106 for connection and connects to the server through an authentication process.

At step 1011, the first electronic device 101 may establish a connection (e.g., pairing) with a Bluetooth device through short range wireless communication (e.g., Bluetooth communication) in the state of being connected to the server 106.

The first electronic device 101 performs a streaming function with the content data provided by the server 106 in response to a user request at step 1020. For example, the first electronic device 101 receives a playlist provided by the server 106 and displays the playlist on the screen. If the user selects a certain content item (e.g. audio and video contents) in the playlist, the first electronic device 101 receives the selected content from the server 106 in a streaming manner and plays the streaming content by means of the display unit and/or audio processing unit.

If the first electronic device 101 has established a connection with a Bluetooth device, the first electronic device 101 transfers the streaming content received from the server 106 to the Bluetooth device connected to it. The first electronic device 101 converts the streaming content received from the server 106 to data suited for Bluetooth communication and transmits the converted data (e.g., streaming data) to the Bluetooth device. The Bluetooth device plays the data received from the first electronic device 101 in the format of the streaming content. For example, if an electronic device 101 of a user A is connected to a car through a Bluetooth channel, the electronic device 101 of the user A transfers, through the Bluetooth, the audio content received from a streaming server to the car. The car plays the audio content received from the electronic device 101 using the audio system of the car.

The first electronic device 101 detects a call connection drop in the state of communicating with the server 106 at step 1012.

At step 1021, the first electronic device 101 checks the communication state change reason and determines whether the streaming service is terminated without the user's intention. For example, if the communication signal strength of the first base station 165 is equal to or less than a predetermined threshold value, if electric wave interference occurs, if the first electronic device 101 moves out of the network coverage of the first base station 165, or if the data amount allocated to the first electronic device 101 in the packet network is exhausted, the first electronic device 101 determines that the call connection drop has occurred without the user's intention.

If the streaming service is terminated without the user's intention, the first electronic device 101 requests the second electronic device 104 for reestablishment of the streaming service at step 1030. For example, the first electronic device 101 configures the information on the second electronic device 104 in advance for A streaming connection request or displays a screen for receiving the information on the second electronic device 104.

The first electronic device 101 provides the server 106 with the streaming connection request information (e.g., identity information of the second electronic device 104 and a streaming service connection request message addressed to the second electronic device 104). A streaming connection request notification may be displayed on the second electronic device 104, in step 1040.

The second electronic device 104 admits the connection in response to the streaming connection request at step 1041. At this time, the second electronic device 104 displays a screen for receiving an input for accepting the connection from the user of the second electronic device 104.

The second electronic device 104 transmits a connection admission signal to at least one of the first electronic device 101 and the server 106 in response to the connection request at step 1031.

The second electronic device 104 connects to the server 106 in response to the connection admission at step 1050. At this step, the first electronic device 101 or the server 106 provides the second electronic device 104 with the user account information or temporary account information for access to the server 106.

The first electronic device 101 may provide the second electronic device 104 with the account information of its user for use in accessing the server 106.

The first electronic device 101 sends the server 106 the information on the first electronic device 101 and the second electronic device 104 and the streaming connection request. Upon receipt of the request from the first electronic device 101 and the admission signal from the second electronic device 104, the server 106 generates temporary account information based on the user account information of the first electronic device 101 and sends the temporary account information to the second electronic device 104. The temporary account information may be the account information that can be used within a predetermined time or during a predetermined period (e.g. one day and one hour coupons).

If the second electronic device 104 connects to the server 106, the first electronic device 101 (or the server 106) sends the second electronic device 104 the information on the streaming content which has been stopped due to the call connection drop, at step 1060.

The second electronic device 104 executes the streaming function by receiving the streaming content, which has been played by the first electronic device 101, from the server 106, at step 1042.

The second electronic device 104 establishes a connection with a Bluetooth device before execution of the streaming function at step 1070. The Bluetooth device connected to the second electronic device 104 may be connected to the first electronic device 101.

If the Bluetooth device connects to both the first electronic device 101 and the second electronic device 104, it may operate as a master device to forward the information received from the first electronic device 101 to the second electronic device 104.

In an embodiment, the second electronic device 104 transfers the streaming content received from the server 106 to the Bluetooth device connected to the second electronic device 104. The Bluetooth device generates the streaming content received from the second electronic device 104.

For example, if users A and B are in a car, the first electronic device 101 of user A may be connected to the car through a Bluetooth link. The first electronic device 101 of user A may then transfer streaming content received from a server to the car through the Bluetooth link such that users A and B enjoy the streaming content together.

If the streaming service is terminated without user A's intention, the second electronic device 104 of user B can receive and play the same streaming content from the server 106 through the process described in steps 1021 to 1042. The second electronic device 104 of user B transfers the received streaming content to the car through the Bluetooth link such that the users A and B can continue enjoying the streaming content in the car.

If the quality of the network connection associated with the first electronic device 101 of the user A recovers, the server 106 sends the information on the streaming content being played by the second electronic device 104 of user B to the first electronic device 101 of user A. Then the first electronic device 101 of user A may resume playback of the streaming content based on the streaming content information provided by the server 106.

Figure 11:
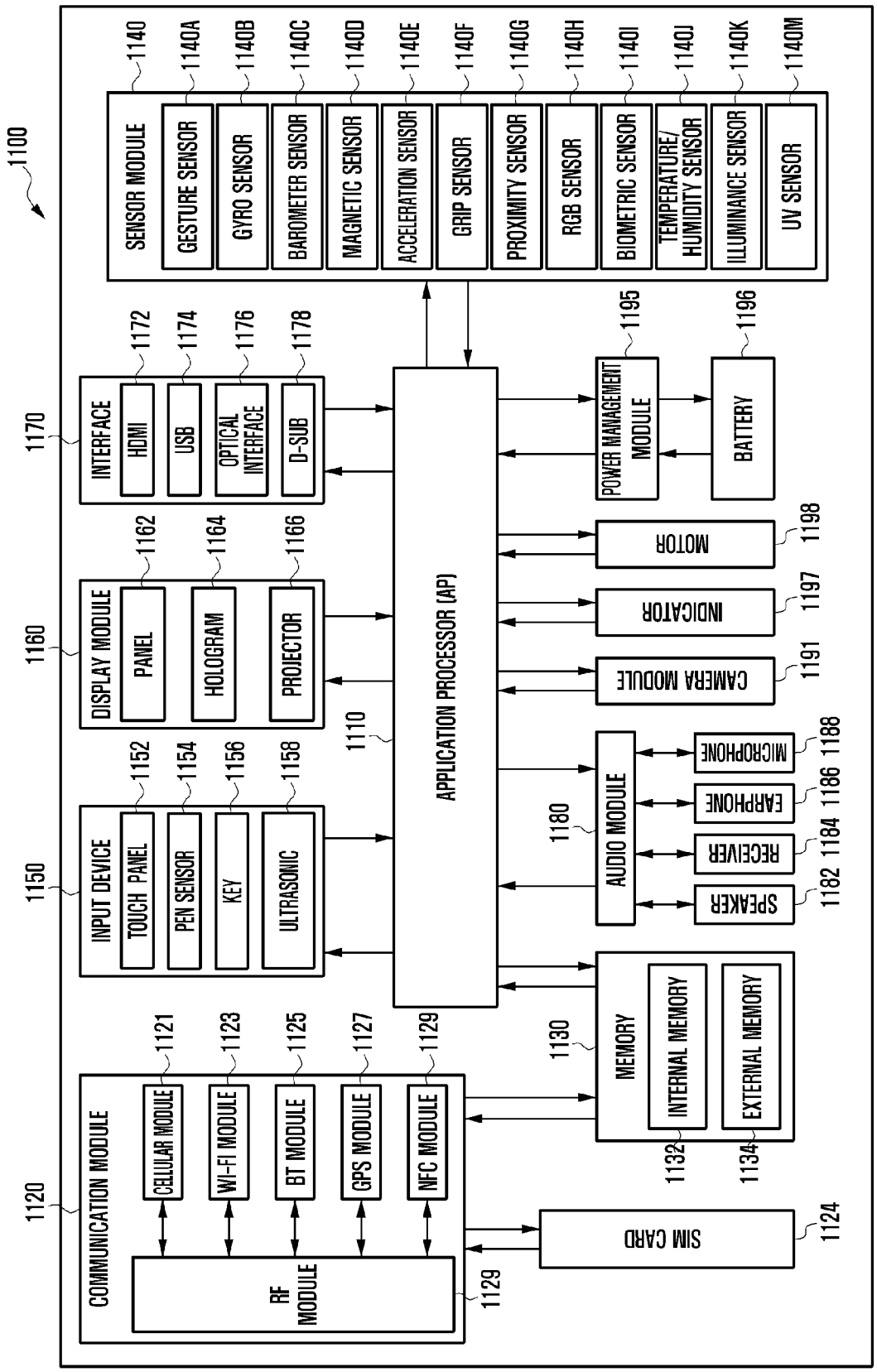
FIG. 11 is a block diagram illustrating a configuration of an electronic device, according to an embodiment of the present invention.

FIG. 11 is a block diagram illustrating a configuration of an electronic device, according to various embodiments of the present invention.

Referring to FIG. 11, the electronic device 1100 is provided. The electronic device 1100 may be of the whole or a part of the electronic device 101. The electronic device 1101 includes an Application Processor (AP) 1110, a communication module 1120, a Subscriber Identity Module (SIM) card 1124, a memory 1130, a sensor module 1140, an input device 1150, a display 1160, an interface 1170, an audio module 1180, a camera module 1191, a power management module 1195, a battery 1196, an indicator 1197, and a motor 1198.

The AP 1110 may operate an Operating System (OS) and/or application programs to control a plurality of hardware and/or software components connected to the AP 1110 and perform data-processing and operations on multimedia data. For example, the AP 1110 may be implemented in the form of System on Chip (SoC). The AP 1110 may include a Graphic Processing Unit (GPU) (not shown).

The communication module 1120 (e.g. communication interface 160) performs data communication with other electronic devices (e.g. electronic device 104 and server 106) through a network (e.g., the network 162). The communication module 1120 includes a cellular module 1121, a Wi-Fi module 1123, a BT module 1125, a GPS module 1127, an NFC module 1128, and a Radio Frequency (RF) module 1129.

The cellular module 1121 is responsible for voice and video communication, text messaging, and Internet access services through a communication network (e.g. LTE, LTE-A, CDMA, WCDMA, UMTS, WiBro, and GSM networks). The cellular module 1121 performs identification and authentication of electronic devices in the communication network using the SIM card 1124. The cellular module 1121 may perform at least one of the functions of the AP 1110. For example, the cellular module 1121 may perform at least a part of the multimedia control function.

The cellular module 1121 may include a Communication Processor (CP). The cellular module 1121 may be implemented in the form of SOC. Although the cellular module 1121 (e.g. the communication processor), the memory 1130, and the power management module 1195 are depicted as independent components separate from the AP 1110, the present invention is not limited thereto, but may be embodied in a way that the AP includes at least one of the components (e.g., the cellular module 1121).

Each of the AP 1110 and the cellular module 1121 (e.g. communication processor) may load a command or data received from at least one of the components on a non-volatile or volatile memory and process the command or data. The AP 1110 or the cellular module 1121 stores the data received from other components or generated by at least one of other components in the non-volatile memory.

Each of the Wi-Fi module 1123, the BT module 1125, the GPS module 1127, and the NFC module 1128 may include a processor for processing the data it transmits/receives. Although the cellular module 1121, the Wi-Fi module 1123, the BT module 1125, the GPS module 1127, and the NFC module 1128 are depicted as independent blocks, at least two of them (e.g. communication processor corresponding to the cellular module 1121 and Wi-Fi processor corresponding to the Wi-Fi module 1123) may be integrated in the form of SoC.

The RF module 1129 is responsible for data communication, e.g. transmitting/receiving RF signals. Although not depicted, the RF module 1129 may include a transceiver, a Power Amp Module (PAM), a frequency filter, and a Low Noise Amplifier (LNA). The RF module 1129 also may include the elements for transmitting/receiving electric wave in free space, e.g. conductor or conductive wire. Although FIG. 11 illustrates the Wi-Fi module 1123, the BT module 1125, the GPS module 1127, and the NFC module 1128 sharing the RF module 1129, the present invention is not limited thereto, but may be embodied in a way that at least one of the Wi-Fi module 1123, the BT module 1125, the GPS module 1127, and the NFC module 1128 transmits/receives RF signals to/from an independent RF module.

The SIM card 1124 is designed to be inserted into a slot formed at a predetermined position of the electronic device 1100. The SIM card 1124 stores unique identity information (e.g., Integrated Circuit Card Identifier (ICCID)) or subscriber information (e.g., International Mobile Subscriber Identity (IMSI)).

The memory 1130 (e.g., the memory 130) includes at least one of the internal memory 1132 and an external memory 1134.

The internal memory 1132 may include at least one of a volatile memory (e.g. Dynamic Random Access Memory (DRAM), Static RAM (SRAM), Synchronous Dynamic RAM (SDRAM) or a non-volatile memory (e.g. One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

The internal memory 1132 may be a Solid State Drive (SSD).

The external memory 1134 may be a flash drive, such as Compact Flash (CF), Secure Digital (SD), micro-SD, Mini-SD, extreme Digital (xD), and Memory Stick. The external memory 1134 is connected to the electronic device 1101 through various interfaces functionally. According to an embodiment, the electronic device 1101 may include a storage device (or storage medium) such as hard drive.

The sensor module 1140 measures physical quantity or checks the operation status of the electronic device 1101 and converts the measured or checked information to an electric signal. The sensor module 1140 may include at least one of gesture sensor 1140A, gyro sensor 1140B, barometric sensor 1140C, magnetic sensor 1140D, acceleration sensor 1140E, grip sensor 1140F, proximity sensor 1140G, color sensor 1140H (e.g. Red, Green, Blue (RGB) sensor), bio sensor 1140I, temperature/humidity sensor 1140J, illuminance sensor 1140K, and Ultra Violet (UV) sensor 1140M. Additionally or alternatively, the sensor module 1140 may include an E-nose sensor, Electromyography (EMG) sensor, Electroencephalogram (EEG) sensor, Electrocardiogram (ECG) sensor, Infrared (IR) sensor, iris sensor, and fingerprint sensor. The sensor module 1140 may further include a control circuit for controlling at least one of the sensors included therein.

The input device 1150 may include a touch panel 1152, a (digital) pen sensor 1154, a key 1156, and an ultrasonic input device 1158.

The touch panel 1152 may be one of capacitive, resistive, infrared, microwave type touch panel. The touch panel 1152 may include a control circuit. In the case of the capacitive type touch panel, it is possible to detect physical contact or approximation. The touch panel 1152 may further include a tactile layer. In this case, the touch panel 1152 provides the user with haptic reaction.

The (digital) pen sensor 1154 may be implemented with a sheet in the same or in a similar way as receiving a touch input of a user or using a separate recognition sheet.

The key 1156 may include physical buttons, an optical key, and a keypad.

The ultrasonic input device 1158 is a device capable of checking data by detecting a sound wave through a microphone 1188 and may be implemented for wireless recognition. The electronic device 1101 may receive user input made by means of an external device (e.g., a computer or a server) connected through the communication module 1120.

The display 1160 (e.g., the display module 150) may include a panel 1162, a hologram device 1164, and a projector 1166.

The panel 1162 is a Liquid Crystal Display (LCD) panel or an Active Matrix Organic Light Emitting Diodes (AMOLED) panel. The panel 1162 may be implemented to be flexible, transparent, and/or wearable. The panel 1162 may be implemented as a module integrated with the touch panel 1152.

The hologram device 1164 displays a 3-dimensional image in the air using interference of light.

The projector 1166 projects an image to a screen. The screen may be placed inside or outside the electronic device 1100. The display 1160 may include a control circuit for controlling the panel 1162, the hologram device 1164, and the projector 1166.

The interface 1170 may include a High-Definition Multimedia Interface (HDMI) 1172, a Universal Serial Bus (USB) 1174, an optical interface 1176, and a D0subminiature (D-sub) 1178.

The interface 1170 includes the communication interface 160 as shown in FIG. 1. Additionally or alternatively, the interface 1170 includes a Mobile High-definition Link (MHL) interface, a SD/MMC card interface, and infrared Data Association (irDA) standard interface.

The audio module 1180 converts sound to an electric signal and vice versa. At least a part of the audio module 1180 may be included in the input/output interface 140 shown in FIG. 1. The audio module 1180 may process the audio information input or output through the speaker 1182, the receiver 1184, the earphone 1186, and the microphone 1188.

The camera module 1191 is a device capable of capturing still and motion pictures and, includes at least one image sensor (e.g. front and rear sensors), a lens, and Image Signal Processor (ISP), and a flash (e.g. LED or xenon lamp).

The power management module 1195 manages the power of the electronic device 1100. Although not shown, the power management module 1195 may include a Power Management Integrated Circuit (PMIC), a charger Integrated Circuit (IC), a battery, and a battery gauge.

The PMIC may be integrated into an integrated circuit or SoC semiconductor. The charging may be classified into wireless charging and wired charge. The charger IC charges the battery 1196 and protects the charger against overvoltage or overcurrent. The charger IC may include at least one of wired charger and wireless charger ICs. Examples of the wireless charging technology includes resonance wireless charging and electromagnetic wave wireless charging. An extra circuit for wireless charging, such as a coil loop, resonance circuit, and diode, may be provided.

The battery gauge measures the residual power of the battery 1196, charging voltage, current, and temperature. The battery 1196 stores or generates power and supplies the stored or generated power to the electronic device 1100. The battery 1196 may include a rechargeable battery or a solar battery.

The indicator 1197 displays an operation status of the electronic device 1100 or a part of the electronic device 1100, booting status, messaging status, and charging status.

The motor 1198 converts the electronic signal to a mechanical vibration.

The electronic device 1100 may include a processing unit (e.g. a GPU) for supporting mobile TV. The processing unit for supporting mobile TV may be able to process the media data conforming to broadcast standards, such Digital Multimedia Broadcasting (DMB), Digital Video Broadcasting (DVB), and media flow.

Each of the components of the electronic device 1100 according to the present invention may be implemented by one or more components and the name of the corresponding component may vary depending on a type of the electronic device. The hardware according to an embodiment of the present invention may include at least one of the above-described elements. Some of the above-described elements may be omitted from the hardware, or the hardware may further include additional elements. Further, some of the components of the electronic device 1100 may be combined to be one entity, which can perform the same functions as those of the components before the combination.

The term "module" used in the present invention may refer to, for example, a unit including one or more combinations of hardware, software, and firmware. The term "module" may be interchangeably used with a term, such as "unit", "logic", "logical block", "component", or "circuit". A "module" may be the smallest unit of an integrated component or a part thereof. A "module" may be the smallest unit that performs one or more functions or a part thereof. A "module" may be mechanically or electronically implemented. For example, a "module", according to the present invention, may include at least one of an Application-Specific Integrated Circuit (ASIC) chip, a Field-Programmable Gate Arrays (FPGA), and a programmable-logic device for performing operations which has been known or are to be developed hereinafter.

According to various embodiments of the present invention, at least some of the electronic devices (for example, modules or functions thereof) or the methods (for example, operations) provided herein, may be implemented by a command stored in a computer-readable storage medium in a programming module form. When the command is executed by one or more processors (for example, the processor 1110), the one or more processors may execute a function corresponding to the command. The computer-readable storage medium may be, for example, the memory 1130. At least a part of the programming module may be implemented by, for example, the processor 1110. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction such as a Read Only Memory (ROM), a Random Access Memory (RAM), a flash memory and the like. In addition, the program instructions may include high-level programming languages, which can be executed in a computer by using an interpreter, as well as machine codes made by a compiler. The aforementioned hardware device may be configured to operate as one or more software modules in order to perform the operation of the present invention.

The programming module according to the present invention may include one or more of the aforementioned components or may further include other additional components, or some of the aforementioned components may be omitted. Operations executed by a module, a programming module, or other component elements according to various embodiments of the present invention may be executed sequentially, in parallel, repeatedly, or in a heuristic manner. Further, some operations may be executed according to another order or may be omitted, or other operations may be added.

As described above, the call service method and apparatus of the present invention is advantageous in terms of allowing to provide the user with the call service information associated with communication error and communication state change reason by the change of the communication network and to recover the communication function if necessary so as to improve the user convenience.

The various embodiments of the present invention described in this specification and illustrated in the drawings are merely examples presented in order to easily describe technical details of the present invention and to help in an understanding of the present invention, and are not intended to limit the scope of the present invention. Therefore, it should be construed that, in addition to the embodiments disclosed herein, all modifications and changes or modified and changed forms derived from the technical idea of various embodiments of the present invention fall within the scope of the present invention. Therefore, the scope of the present invention is defined not by the scope of the detailed description and embodiments, but by the following claims and their equivalents.

What is claimed is:

1. A call service method of an electronic device, the method comprising:
   detecting a communication state change with a counterpart electronic device;
   checking a reason for the communication state change; and
   performing at least one of displaying communication state information based on the reason for the communication state change and recovering a communication connection,
   wherein checking the reason for the communication state change comprises determining whether a communication state is changed based on a predetermined input signal and communication error code information included in a communication signal.

2. The method of claim 1, wherein the predetermined input signal instructs to end the communication connection.

3. The method of claim 1, wherein checking the reason for the communication state change further comprises determining, when the predetermined input signal is not received, that the communication state is changed due to an external cause.

4. The method of claim 1, wherein detecting the communication state change comprises determining at least one of whether a strength of a communication signal of a base station is equal to or less than a predetermined threshold, whether the electronic device moves out of a cell coverage area of the base station, and whether communication service information of the counterpart electronic device is changed.

5. The method of claim 1, wherein recovering the communication connection comprises requesting, when the communication connection drops due to an external cause, reestablishment of the communication connection with the counterpart electronic device.

6. The method of claim 5, wherein recovering the communication connection further comprises requesting reestablishment of the communication connection through a network different from a network on which the communication connection has dropped.

7. The method of claim 1, further comprising:
   analyzing, when video data is not received from the counterpart electronic device or a strength of a communication signal carrying the video data is equal to or less than a predetermined threshold, voice data and expression data;
   determining an emotion factor of a counterpart user based on the analyzed voice and expression data; and
   displaying a still image of the counterpart user, which is modified according to the emotion factor of the counterpart user.

8. The method of claim 7, wherein the still image of the counterpart user is one of an image stored in association with identity information of the counterpart electronic device and an image received from the counterpart electronic device in the communication connection.

9. The method of claim 1, wherein displaying the communication state information comprises displaying, when the communication connection drops due to an external cause, a call connection screen during a predetermined period or displaying a call connection reestablishment request item.

10. An electronic device comprising:
    a communication unit configured to transmit and receive communication signals;
    a display unit configured to display communication service information; and
    a processor configured to detect a communication state change with a counterpart electronic device, check a reason for the communication state change, control the display unit to display communication state information on a screen based on the reason for the communication state change, and recover a communication connection,
    wherein the processor is further configured to determine whether a communication state is changed based on a predetermined input signal and communication error code information included in a communication signal.

11. The electronic device of claim 10, wherein the processor is further configured to determine, when the predetermined input signal is not received, that the communication state is changed due to an external cause.

12. The electronic device of claim 10, wherein the processor is further configured to request, when the communication connection drops due to an external cause, reestablishment of the communication connection with the counterpart electronic device.

13. The electronic device of claim 10, wherein the processor is further configured to control the display unit to display, when the communication connection drops due to an external cause, a communication connection screen during a predetermined period or to display a communication connection reestablishment request item.

14. The electronic device of claim 10, wherein the processor is further configured to control outputting the communication state information with at least one of a sound effect, an illumination effect, and a vibration effect.

15. The electronic device of claim 10, further comprising:
    an emotion analysis module configured to analyze voice data and expression data to determine an emotion of a counterpart user; and
    an image processing module configured to modify a still image of the counterpart user according to an emotion factor of the counterpart user,
    wherein the processor is further configured to control, when video data is not received from the counterpart electronic device and a strength of a signal carrying the video data is equal to or less than a threshold, the display unit to display the still image of the counterpart user, the still image being modified based on the voice and expression data.

16. The electronic device of claim 15, wherein the still image of the counterpart user is one of an image stored in association with identity information of the counterpart electronic device and an image received from the counterpart electronic device in the communication connection.

17. The electronic device of claim 10, further comprising a short range communication module,
    wherein the processor is further configured to control the communication unit to receive a streaming content from a server, control the short range communication module to transmit the streaming content to the counterpart electronic device, and control, when the communication state change is detected, the communication unit to transmit at least part of the streaming content to the counterpart electronic device.

18. The electronic device of claim 17, wherein the processor is further configured to request, when the communication connection drops due to an external cause, the server providing the streaming content and the counterpart electronic device for a streaming connection and control, when a signal of permitting the streaming connection from the counterpart electronic device is received, the communication unit to transmit server access account information and the at least part of the streaming content in response to the permission signal.

\* \* \* \* \*